June 29, 1937.  A. A. STEINMETZ  2,085,515
METHOD OF AND SYSTEM FOR RECTIFYING AND INCREASING
THE FREQUENCY OF ALTERNATING CURRENTS
Filed Nov. 25, 1935  2 Sheets-Sheet 1

INVENTOR
A. A. STEINMETZ
BY Eugene E. Brown
ATTORNEY

June 29, 1937. A. A. STEINMETZ 2,085,515
METHOD OF AND SYSTEM FOR RECTIFYING AND INCREASING
THE FREQUENCY OF ALTERNATING CURRENTS
Filed Nov. 25, 1935  2 Sheets-Sheet 2
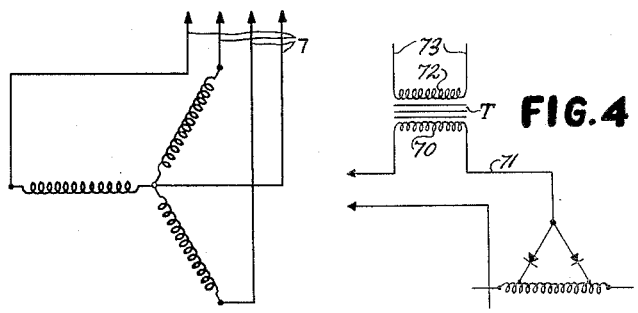
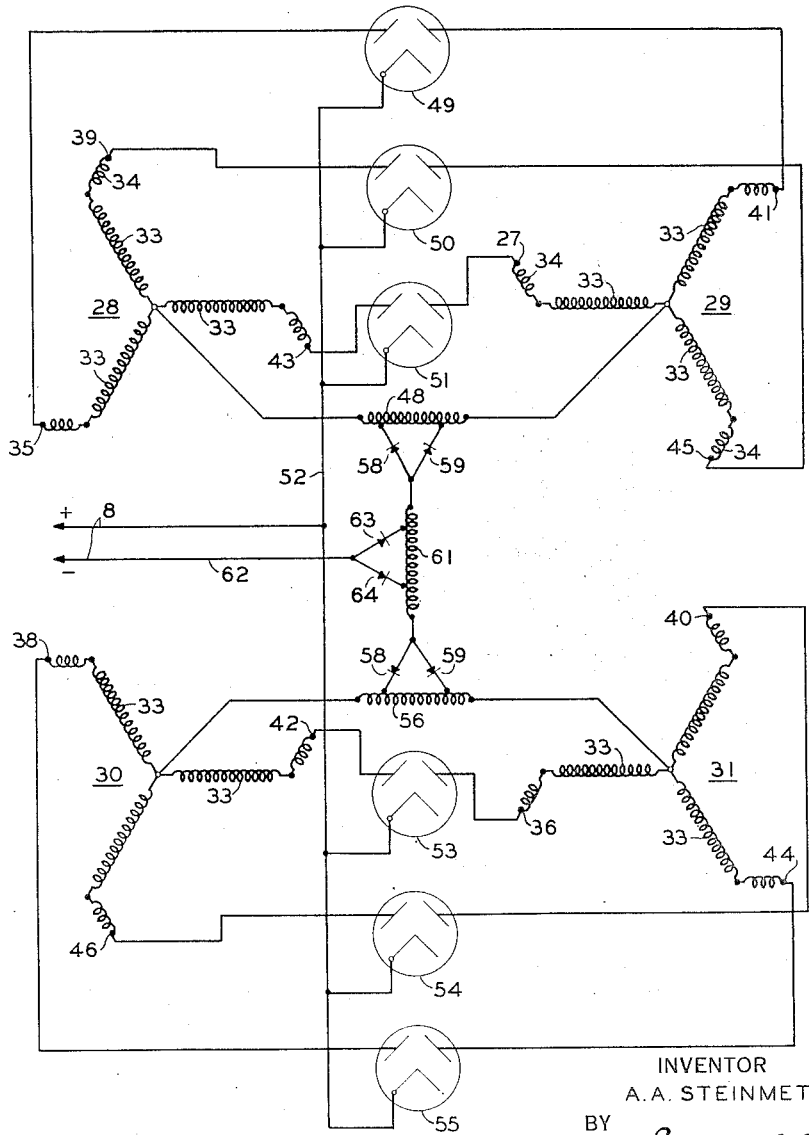
INVENTOR
A.A. STEINMETZ
BY
Eugene C Brown
ATTORNEY Patented June 29, 1937

2,085,515

UNITED STATES PATENT OFFICE 2,085,515

METHOD OF AND SYSTEM FOR RECTIFYING AND INCREASING THE FREQUENCY OF ALTERNATING CURRENTS

Alfred A. Steinmetz, Scarsdale, N. Y., assignor to The Western Union Telegraph Company, New York, N. Y., a corporation of New York Application November 25, 1935, Serial No. 51,546

10 Claims. (Cl. 172—281)

The present invention relates to a method of and system for rectification and more particularly to a novel polyphase rectifier system especially adapted for use with telegraphic circuits and apparatus or other circuits requiring a substantially steady direct current.

In rectifier systems of the usual type, the output includes an alternating current component of relatively low frequency which appears as a ripple or undulation of the direct current furnished by the rectifier. This ripple or undulation may be substantially removed by employing a filter network. However, for certain purposes a filter network, which to be effective includes an inductance in series with the load, is unsuitable for use when the rectifier is used to furnish current to apparatus associated with a communication circuit, such as a telegraph cable circuit. The reactance which is necessarily present in the filter network causes the system to give poor dynamic voltage regulation and lowers its efficiency. The former disadvantage applies particularly with telegraph circuits because of the nature of the signals transmitted.

In accordance with the present invention, the frequency of the voltage ripple or undulation appearing in the output of a polyphase rectifier is multiplied and the amplitude thereof is decreased so that the direct current voltage and hence the current output of the rectifier approaches a straight line representing an ideal direct current. This is accomplished by my present invention in a novel and simple manner which does not materially increase the initial cost of the polyphase rectifier.

Accordingly, it is a major object of the present invention to provide, in a rectifying system, a novel method and means for smoothing out the ripple or undulation of the output voltage and current which will overcome the above mentioned disadvantages of filter arrangements of the prior art and thereby adapt the system for efficient use with a telegraph circuit.

A further object of the present invention involves a novel method of compensating for a departure from a sine wave form of the voltage of the alternating current power supply.

Still another object of the present invention is to provide an arrangement of apparatus for multiplying the frequency of the undulation or ripple of the output voltage and at the same time decreasing the amplitude thereof in a rectifier system.

The manner in which the foregoing and other and more specific objects are accomplished will be clear from the following description of my invention. In the drawings to which constant reference will be made in the course of the disclosure of the several illustrative embodiments of the invention:

Fig. 3 is a view similar to Fig. 1 but showing connections for a twelve-phase rectifier system; and Fig. 4 is a fragmentary diagrammatic illustration of one way of obtaining the multiplied frequency alternating current for use.

Figure 1:
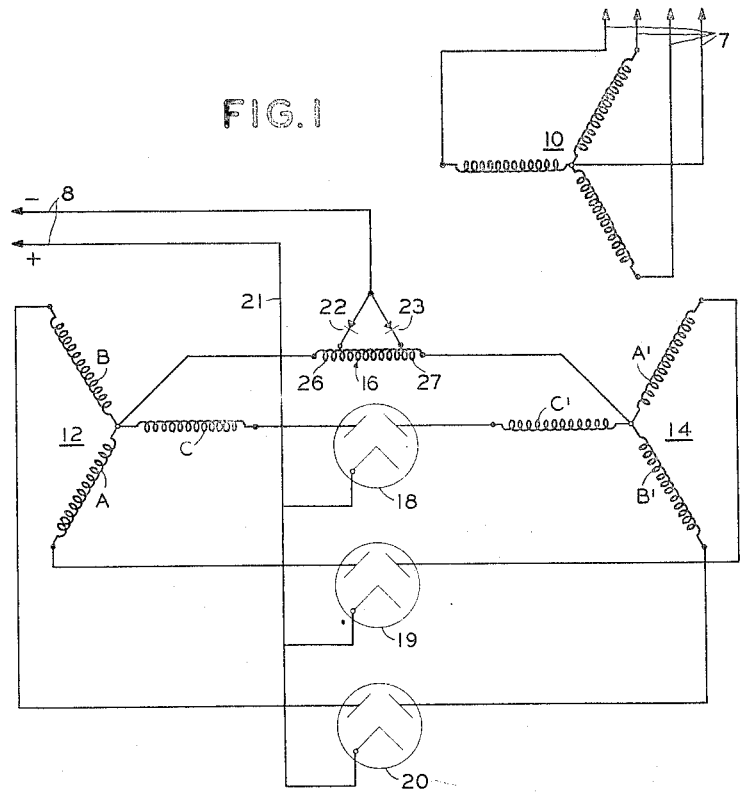
Fig. 1 is a diagrammatic showing of a six-phase rectifier system embodying the present invention.

Referring to Fig. 1 illustrating a system embodying the present invention for transmitting energy from a three-phase alternating current circuit 7 to a direct current circuit 8, reference character 10 designates the "star" connected primary windings of a supply transformer which are connected to the source 7. It will be understood that these transformer primary windings may be equally well connected to form a "delta" network. The secondary windings of the transformer are arranged in two groups 12 and 14 which comprise the coils A, B, C and coils A', B', C' respectively. The electrical neutral points of these groups are interconnected through a reactor 16 which is similar to an interphase transformer but differs therefrom in structure and function in a manner to be explained in detail. The terminals of the coils in the two groups are connected to the anodes of three rectifying devices 18, 19 and 20, which may be of the thermionic type as shown. However, a mercury arc discharge rectifier may be employed without "keep alive" arrangements if all of its anodes are in a single container. The terminals of the coils C and C' are connected to the anodes of the rectifier 18; coils A and A' to the rectifier 19 and coils B and B' to the rectifier 20. The cathodes of the rectifiers are joined to a conductor 21 which forms the positive terminal of the direct current circuit 8.

The inductance 16 has two taps adjacent each end of its winding and connections are made from the negative terminal of the direct current circuit 8 to these taps through two half wave rectifier units 22 and 23 which may be dry, electrolytic or tube rectifiers. For a sine wave input to the rectifier system approximately 26.8% of the windings of the reactor 16 are embraced between the end of the winding and the adjacent tap to which one of the rectifiers 22 or 23 is connected. The short end sections of the reactor are designated 26 and 27, respectively. Where the wave form of the input to the rectifier deviates from a sine-wave form, the location of the taps for connection of the rectifiers 22 and 23 may be selected to compensate for the distorted wave. If the supply wave is peaked, the tap percentage is reduced to approach the same amplitude of the ripple as appears with a sine wave supply. If the supply wave is flat topped, the tap percentage is also reduced to get the same frequency of ripple wave.

In general where two ripple frequencies are 180° out of phase, the tapped reactor disclosed herein can be used to double the output frequency. The alternating current in the output circuit 8 which has a higher frequency than the frequency of the supply source 7, may be utilized for any purpose by connecting the primary of a transformer, for example, in the output circuit.

The above described system embodying the invention operates as follows: Current may flow in only one direction due to the rectifying properties of the tubes 18 to 20 and when current flows from an anode, the cathodes are at the same positive potential as the anode neglecting the tube voltage drop. In order for current to flow from any other anode, its positive potential must equal or exceed the voltage of the operating anode so as to overcome the rectifying properties of the rectifiers. Since the positive potential of each anode exceeds the others in succession once for each cycle of primary supply, the anodes will alternately pass current and a series of undulations appears in the output current and voltage which is represented on Fig. 2 by the upper portion of the curves. In the absence of the inductance 16, at point m for example, phase winding C' is at its highest potential and the anode connected to that winding passes current until point x is reached, at which point the potentials of windings C' and A are equal. From point x to point y the potential of winding A increases to its maximum and then begins to decrease until at point y it is equal to the potential of the winding B'. Beyond point y the anode connected to the winding A ceases to pass current and the anode connected to the winding B' begins to pass current as its potential exceeds that of A. The direct current output from the rectifier system without, as stated above, using the inductance 16, is the curve x, n, y, o, z, and for a 60 cycle supply this produces a ripple having a frequency of 360 cycles per second. This class of operation is usual and well known.

With the inductance 16 in the connection between the neutral points of the groups 12 and 14 and serving as an ordinary interphase transformer by having the negative terminal of the direct current circuit connected to a mid-tap, the rectifier principles outlined above apply and in addition, when current flows from one anode of a group, this current also flows through half the winding of the reactor. This current induces a voltage in the other half of the reactor which raises the positive potential of the anodes of the other group, with respect to the negative terminal, to the point where an anode of each group is at the same potential. Anodes of both groups, therefore, pass current simultaneously. The undulations in the output as shown by the curve $a$—$x$—$b$—$y$—$c$—$z$ of Fig. 2 still have a frequency of 360 cycles for a 60 cycle supply.

Figure 2:
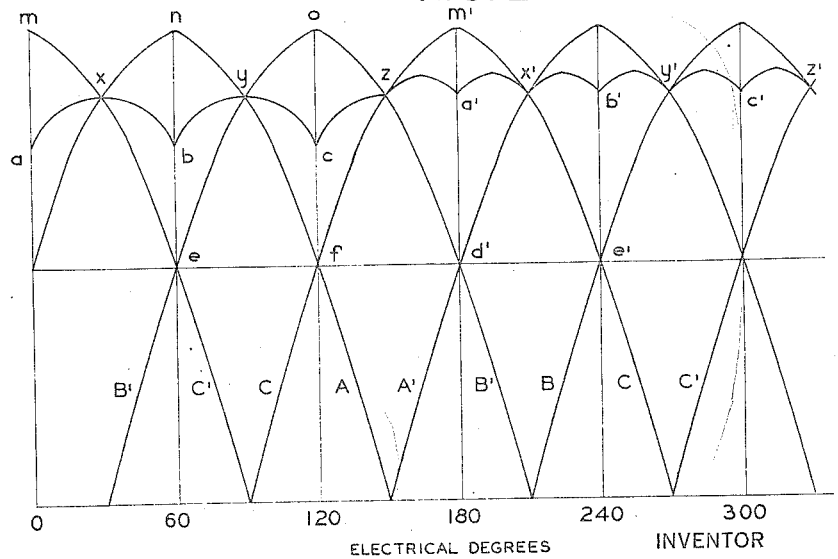
Fig. 2 is a graphic showing of the anode potentials of the rectifier of Fig. 1 in operation.

In accordance with the invention, the frequency of the undulations appearing in the output circuit is doubled as shown by the curve $z$—$a'$—$x'$—$b'$, etc. which is produced by employing the connections described above, including the rectifiers 22 and 23. This doubling of the ripple frequency may be explained as follows: In operation the anode current from one group of windings flows through one of the rectifiers 22 or 23 and the portion of the reactor 16 forming the shortest electrical path to that group. This current causes a voltage drop in the short portion of the reactor which is small compared to the induced voltage created in the remainder of the winding. The induced voltage raises the positive potential of the anodes of the other group, causing an anode of that group to operate simultaneously with an anode of the first group. Referring to Fig. 2, at the point $m'$ for example, phase winding C is at its highest potential and the anode connected to that winding passes current. This current flows through the short portion 26 of the reactor winding 16 which causes a voltage drop in the reactor equal to $m'$ $a'$. An induced voltage is thereby set up in the remainder of the reactor winding which raises the voltage of the anode connected to the winding A' from the point $d'$ to $a'$. The output curve $z$, $a'$, $x'$, $b'$, $y'$, $c'$, $z'$ for a 60 cycle supply has a ripple, the frequency of which is 720 cycles which is twice the frequency obtained without the rectifiers 22 and 23 and the amplitude of the ripple is considerably less.

It may be noted that the voltage at the point $a'$ is the same as at point $x'$ where the voltage of windings C and A' is equal. At the point $x'$ the flow of current through the rectifier 22 is transferred to the rectifier 23 through the tap on the reactor forming the shortest path to the anode connected to the winding C so that the resultant output voltage falls on the curve $x'$, $b'$. At point $e'$ on Fig. 2, the voltage on the winding B equals that on C and that portion of the current that was passing through the winding C is transferred to the anode connected to the winding B.

The ratio of the voltage drop in the short section of the reactor to the voltage induced in the long section thereof is 1 to 2.72, in order that points $a'$, $b'$, $c'$ of Fig. 2 will be at the same voltage as points $x'$, $y'$, $z'$.

As stated previously, the reactor taps for the rectifiers in the negative direct current output lead of the transformer secondary group or groups may be located to compensate for the input wave form. Referring to Fig. 2, if the input wave is peaked, the voltage waves A' and B' will intersect below the point $d'$ and to maintain the voltage indicated at the point $a'$, it will be necessary to move the reactor taps nearer to the ends of the reactors, reducing the percentage of the windings embraced between the ends of the winding and the adjacent tap so that the tap percentage has a value smaller than 26.8%. If the input wave is flat topped, the voltage waves A' and B' will intersect above the point $d'$ and the voltage indicated at the point $a'$ may also be maintained by decreasing the tap percentage.

The relatively high frequency alternating current produced in accordance with the invention may be supplied for utilization to an alternating current load circuit by a transformer T as shown by Fig. 4. The primary 70 of the transformer T is connected in circuit with the conductor 71 which may be the lead 62 of Fig. 3 or the lead shown on Fig. 2 which is connected to the common terminals of the rectifiers 22 and 23. The primary 70 may also be connected in circuit with the conductor of either figure which connects with the cathodes of the rectifiers. The alternating current of multiplied frequency will appear in the secondary 72 which is connected to the alternating current load by conductors 73.

In Fig. 3 is shown a modification of the invention in which the secondary winding system of the supply transformer or transformers comprises four three-phase zigzag secondary groups 28, 29, 30, and 31. The primary windings of the transformer or transformers are connected to a three-phase alternating current circuit 7. Each phase of these secondary groups comprises a main winding 33 inductively related to each of the primary phases. The groups 28 and 29 have auxiliary coils 34 from the next primary but reversed in polarity, connected in series with the main coils. The groups 30 and 31 have their auxiliary coils energized from the next retarded primary phase and are also reversed in polarity so as to retard the phase of the resultant voltage. The main and auxiliary coils of the groups 28 to 31 are so proportioned that the voltages appearing at the terminals 35 to 46 are displaced in phase by thirty electrical degrees with respect to their common points.

The electrical neutral points of the groups 28 and 29 are interconnected through a tapped reactor 48 which is similar in function to the reactor 16. The terminals of the coils of the two groups are connected to the anodes of rectifiers 49 to 51, preferably in the manner shown by Fig. 3. The cathodes of these rectifiers are joined to a conductor 52 which is connected to the positive terminal of the direct current circuit 8. Likewise, the terminals of the coils of the groups 30 and 31 are connected to the anodes of rectifiers 53, 54, and 55, and the electrical neutral points of these groups are interconnected through a tapped reactor 56. The cathodes of the rectifiers 53 to 55 are also joined to the conductor 52. The taps on the reactors 48 and 56 are bridged by a plurality of pairs of rectifiers 58 and 59 and these rectifier pairs are connected to opposite ends of a third reactor 61 which is tapped in a manner similar to the reactors 48 and 56. The conductor 62 provides a connection from the negative terminal of the direct current circuit 8 to the taps on the reactor 61 through the rectifiers 63 and 64.

In operation of the system of Fig. 3, the secondary groups 28 and 29 and also groups 30 and 31 and the rectifiers associated with these groups function in a manner similar to that already described in connection with the operation of the secondary groups 12 and 14 of Fig. 1. The frequency of the ripple which appears in the combined output of the secondary groups 28 and 29 is 360 cycles and the rectifiers 22 and 23 acting in conjunction with the reactor 48 serve to double the frequency of this ripple and decrease its amplitude. Also, the frequency of the ripple appearing in the combined output of the secondary groups 30 and 31 is doubled in frequency and reduced in amplitude by the action of the reactor 56 and the rectifiers 58 and 59. However, the ripple frequency appearing in the combined output of the groups 30 and 31 is 180° out of phase with ripple frequency of the groups 28 and 29.

Therefore, the tapped reactor 61 acting in conjunction with the rectifiers 63 and 64 doubles the combined ripple frequency of 1440 cycles so that the ripple which appears in the direct current circuit 8 has a frequency of 2880 cycles with the added advantage that the ripple amplitude is reduced.

While I have shown and described by way of illustration two systems embodying the present invention, the invention may be embodied in other forms and therefore, the invention is not limited except as indicated by the terms and scope of the appended claims.

I claim as my invention:

1. In a rectifier system, a plurality of sources of multiphase alternating currents each source having a neutral point, rectifying means and connections from each phase of said sources to terminals of the same polarity of said rectifying means, a connection between said neutral points including an inductive winding, a pair of interconnected rectifiers connected to intermediate points of said inductive winding, and a circuit between an intermediate point of said pair of rectifiers and terminals of said rectifying means of opposite polarity to the terminals connected to the phases of said groups.

2. The method of increasing the frequency of the undulations appearing in the output of a rectifier system which comprises combining undulations 180° out of phase with respect to each other in a manner to produce an undulation of double the frequency of said undulations.

3. In a polyphase rectifier system comprising rectifying means, a plurality of sources of polyphase current connected to said rectifying means, and ripple frequency doubling means interconnecting the neutral points of said sources whereby said rectifier system is capable of supplying direct current having a ripple of a frequency double that of the normal value and a substantially decreased amplitude to a circuit connected to one pole of said rectifying means and said ripple frequency doubling means.

4. In a rectifier system comprising rectifying means, a plurality of sources of polyphase current connected to said rectifying means, frequency doubling means including a reactor connecting the neutral points of said sources and a pair of rectifying devices having like terminals connected together, taps on said reactor adjacent the ends thereof to which the remaining terminals of said devices are connected and a direct current circuit between the interconnected terminals of said rectifying devices and said rectifying means.

5. A polyphase rectifier system capable of supplying direct current with a ripple frequency double that of normal comprising rectifying means, a plurality of sources of polyphase current connected to said rectifying means, a reactor connecting the neutral points of said sources, a pair of rectifying devices having their like terminals connected together, taps on said reactor so located that approximately 26.8% of the windings of the reactor are embraced between each reactor terminal and a tap, the remaining terminals of each rectifying device being connected to said taps, and a direct current output circuit having for one terminal the interconnected terminals of said devices and said first named rectifying means for the other terminal.

6. In a power supply system, polyphase transforming apparatus, a direct current circuit, space discharge devices interposed between said transforming apparatus and said circuit, a reactor and a pair of interconnected rectifiers bridging a portion of said reactor, and a connection from said circuit to the point of interconnection of said rectifiers.

7. In a rectifier system comprising rectifying means, a plurality of sources of polyphase current connected to said rectifying means, a reactor connecting the neutral points of said sources and a pair of rectifying devices having like terminals connected together, taps on said reactor to which the remaining terminals of said devices are connected, the location of said taps on said reactor being selected to compensate for distortion in the wave form of the input to said sources.

8. In a polyphase rectifying system, a plurality of groups of rectifying devices and a plurality of pairs of polyphase groups of transformer secondary windings; connections from one of said pairs of secondary groups to one of said groups of devices and a reactor interconnecting the neutral points thereof; connections from another of said pairs of secondary groups to another of said groups of devices and a reactor interconnecting the neutral points thereof; taps on said reactors and a pair of interconnected rectifying devices bridging the taps on each reactor; an additional reactor connected between said pairs of rectifying devices, an additional pair of interconnected rectifying devices bridging taps on said additional reactor, and a direct current output circuit connected to said groups of rectifying devices and to the point of interconnection of said interconnected additional rectifiers.

9. A system for supplying an output circuit with an alternating current having a frequency higher than the frequency of the supply source comprising a plurality of rectifiers, transforming apparatus supplying said rectifiers with alternating current from a source of alternating current having a given frequency, connections from said rectifiers to said output circuit, an inductance interconnecting said rectifiers, said inductance having a tap spaced from each end thereof, a pair of rectifying devices each having a terminal connected to said output circuit, the free terminals of said pair connected to said taps, said inductance and said pair of devices serving to increase the frequency of the alternating current in said output circuit.

10. In combination, an input circuit and an output circuit, transforming and rectifying apparatus interconnecting said circuits, a frequency doubling arrangement associated with said rectifying apparatus comprising an inductance having a tap spaced from each end thereof and a pair of interconnected rectifying devices, the free terminals of said pair being connected to said taps.

ALFRED A. STEINMETZ.